US009692771B2

(12) United States Patent
Dinerstein et al.

(10) Patent No.: US 9,692,771 B2
(45) Date of Patent: Jun. 27, 2017

(54) SYSTEM AND METHOD FOR ESTIMATING TYPICALITY OF NAMES AND TEXTUAL DATA

(71) Applicant: Blue Coat Systems, Inc., Sunnyvale, CA (US)

(72) Inventors: Jonathan Jeremiah Dinerstein, Draper, UT (US); Christian Earnest Larsen, Orem, UT (US); David Francis Meyer, Spanish Fork, UT (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/765,606

(22) Filed: Feb. 12, 2013

(65) Prior Publication Data

US 2014/0230054 A1   Aug. 14, 2014

(51) Int. Cl.
*G06F 11/00* (2006.01)
*H04L 29/06* (2006.01)
*G06F 12/14* (2006.01)

(52) U.S. Cl.
CPC .................................. *H04L 63/14* (2013.01)

(58) Field of Classification Search
CPC ... H04L 63/1416; H04L 12/585; H04L 51/12; H04L 1/0061; G06F 11/1012; G06F 11/108; G06F 2211/109; G06F 11/1076; G06F 11/10; G06F 11/1004; G06F 11/1044; G06F 11/1068; G06F 3/0679
USPC .......................................................... 726/22
See application file for complete search history.

(56) References Cited

U.S. PATENT DOCUMENTS

| 7,639,714 | B2* | 12/2009 | Stolfo et al. ................... 370/474 |
| 7,802,184 | B1* | 9/2010 | Battilana ............... G06F 3/0236 715/256 |
| 8,260,914 | B1* | 9/2012 | Ranjan ........................ 709/224 |
| 8,706,728 | B2* | 4/2014 | Nicks ............... G06F 17/30672 707/736 |
| 2006/0015630 | A1* | 1/2006 | Stolfo et al. .................. 709/230 |
| 2006/0080309 | A1* | 4/2006 | Yacoub ............. G06K 9/00463 |
| 2006/0282267 | A1* | 12/2006 | Lopez-Barquilla ..... G10L 15/18 704/257 |
| 2008/0140576 | A1* | 6/2008 | Lewis ............... G06Q 10/0635 705/67 |
| 2008/0172738 | A1* | 7/2008 | Bates ............... G06F 17/30887 726/22 |
| 2009/0034851 | A1* | 2/2009 | Fan et al. ...................... 382/230 |
| 2009/0043721 | A1* | 2/2009 | Reznik ............. G06F 17/30887 706/20 |

(Continued)

OTHER PUBLICATIONS

Sandeep Yadav, Ashwath K.K. Reddy, and A.L. Narasimha Reddy "Detecting Algorithmically Generated Malicious Domain Names", IMC'10, Nov. 1-3, 2010, Melbourne, Australia, 2010.*

*Primary Examiner* — Gary Gracia
(74) *Attorney, Agent, or Firm* — Holland & Hart LLP

(57) ABSTRACT

According to one aspect, a method of assessing typicality of a first name that includes a plurality of characters includes obtaining the first name, determining at least a first N-gram size, and extracting a first plurality of N-grams of the first N-gram size from the first name. The first plurality of N-grams is analyzed with respect to a model. Analyzing the first plurality of N-grams with respect to the model includes obtaining a first score. Finally, the method includes determining whether the first score indicates that the first name is typical.

20 Claims, 8 Drawing Sheets

(56) References Cited

U.S. PATENT DOCUMENTS

| | | | | |
|---|---|---|---|---|
| 2009/0125371 | A1* | 5/2009 | Neylon | G06F 17/30616 707/739 |
| 2009/0193293 | A1* | 7/2009 | Stolfo | G06F 21/564 714/26 |
| 2009/0265778 | A1* | 10/2009 | Wahl et al. | 726/13 |
| 2009/0319342 | A1* | 12/2009 | Shilman et al. | 705/10 |
| 2010/0064368 | A1* | 3/2010 | Stolfo | G06F 21/564 726/24 |
| 2010/0070262 | A1* | 3/2010 | Udupa | G06F 17/2735 704/7 |
| 2010/0205123 | A1* | 8/2010 | Sculley | H04L 63/1408 706/12 |
| 2011/0208723 | A1* | 8/2011 | Nicks | G06F 17/30672 707/723 |
| 2011/0214161 | A1* | 9/2011 | Stolfo | H04L 63/102 726/4 |
| 2011/0247072 | A1* | 10/2011 | Staniford et al. | 726/24 |
| 2012/0054860 | A1* | 3/2012 | Wyschogrod | H04L 29/12066 726/22 |
| 2012/0110672 | A1* | 5/2012 | Judge | H04L 51/12 726/25 |
| 2012/0222121 | A1* | 8/2012 | Staniford et al. | 726/24 |
| 2013/0030793 | A1* | 1/2013 | Cai | G06F 17/28 704/9 |
| 2013/0031061 | A1* | 1/2013 | Jagota | 707/690 |
| 2013/0185230 | A1* | 7/2013 | Zhu et al. | 706/12 |
| 2013/0191915 | A1* | 7/2013 | Antonakakis et al. | 726/23 |
| 2013/0318116 | A1* | 11/2013 | Starbuck et al. | 707/758 |
| 2014/0101762 | A1* | 4/2014 | Harlacher et al. | 726/23 |

\* cited by examiner

SYSTEM AND METHOD FOR ESTIMATING TYPICALITY OF NAMES AND TEXTUAL DATA

BACKGROUND

Field of Invention

The present disclosure relates generally to Internet security. More particularly, the present disclosure relates to determining whether an Internet domain name is indicative of a malicious Internet domain by measuring the typicality of the Internet domain name relative to known typical domain names.

Description of the Related Art

When a user accesses a malicious Internet domain using a device such as a computer, the security of the device may be compromised. When the security of a device is breached as a result of accessing a malicious Internet domain, confidential information may be compromised, and the device may be rendered non-operational.

Some domain names are "botnet" domain names, and are typically characterized by a random combination of characters. As will be appreciated by those of skill in the art, a botnet includes more than one computer, e.g., more than one "bot," that is controlled by a malicious party. Botnets propagate malicious software across a network, e.g., the Internet. If a botnet domain name may be identified as being a malicious domain name, i.e., a domain name associated with a malicious domain, before a user accesses the malicious domain using a device in his possession, the user may effectively be saved from compromising the security of his device. Methods used to identify botnet domain names or otherwise detect botnet domains directly detect the botnet domain names using bigrams.

Some methods that identify botnet names using bigrams may construct a statistical model of bigrams that are likely to appear in botnet names. Typically, the bigrams include strange combinations of letters from a linguistic standpoint. The approach of constructing a statistical model of bigrams that are likely to appear in botnet names is limited, as there are far more possible strange combinations of letters than there are natural combinations. Methods used to identify botnet domain names are generally not effective in identifying other types of malicious or evil domain names. The methods used to identify botnet domain names generally do not effectively identify domain names which include misspellings of common words and randomly combined dictionary words. Domain names which include suggestive words, e.g., words relating to pornography, and domain names which are designed to lure unsuspecting users, e.g., "antivirus-protection-download," are also generally not identified as being malicious by the methods used to identify botnet domain names.

SUMMARY

The present invention pertains to a system and a method for detecting typical, e.g., safe or benign, names such as domain and/or file names. Using information associated with domain and/or file names that are known to be safe, patterns in a particular domain and/or file name that is being assessed may be analyzed to determine whether the particular domain and/or file name is likely to be safe.

According to one aspect, a method of assessing typicality of a first name that includes a plurality of characters includes obtaining the first name, determining at least a first N-gram size, and extracting a first plurality of N-grams of the first N-gram size from the first name. The first plurality of N-grams is analyzed with respect to a model. Analyzing the first plurality of N-grams with respect to the model includes obtaining a first score. Finally, the method includes determining whether the first score indicates that the first name is typical. In one embodiment, the model includes a set of N-grams associated with known typical names, and analyzing the first plurality of N-grams with respect to the model includes comparing the first plurality of N-grams to the set of N-grams. In such an embodiment, the score provides an indication of how the first plurality of N-grams compares to the set of N-grams.

According to another aspect, an apparatus configured to estimate whether a particular name is typical includes a communications interface, a module that includes computer program code, and a processing arrangement that executes the computer program code. The communications interface is configured to obtain a first domain name. The module extracts a first plurality of N-grams of a first size from the first domain name, and obtains a score for the first domain name using the first plurality of N-grams. The module also determines whether the score indicates that the first domain name is typical, and is configured to obtain the score for the first domain name by comparing the first plurality of N-grams to a set of N-grams. The set of N-grams is associated with a plurality of known typical domain names.

BRIEF DESCRIPTION OF THE DRAWINGS

The embodiments will be readily understood by the following detailed description in conjunction with the accompanying drawings, in which.

DETAILED DESCRIPTION OF THE EMBODIMENTS

Example embodiments of the present invention are discussed below with reference to the various figures. However, those skilled in the art will readily appreciate that the detailed description given herein with respect to these figures is for explanatory purposes, as the invention extends beyond these embodiments.

Malicious Internet web sites, domains, and files often cause significant problems when they are accessed. For example, when a computer is used to access a malicious Internet domain, the computer may become infected and, as a result, the security of the computer may be compromised. When the security of a computer is compromised, information stored on the computer, e.g., personal information associated with an owner of the computer, may become available to unscrupulous parties.

Many malicious Internet domains and files are identified with unusual names, or names which are statistically odd. By detecting an unusual name, and analyzing whether the unusual name is likely to be associated with a benign domain or file, the likelihood of accessing a malicious domain or file may be decreased. For example, when an Internet domain is identified as likely to be malicious prior to a user gaining access to the Internet domain using a device in his possession, the user may be warned that accessing the Internet domain may compromise the security of his device.

Suspicious domain names may be efficiently identified by estimating the typicality of domain names. When a domain name is typical, content associated with a domain identified by the domain name is generally essentially known to be safe, benign, and/or valid. In other words, a typical domain name is a domain name that is associated with a domain that is not malicious.

Known typical domain names may be modeled, and models created based on known typical domain names may be applied to essentially measure the typicality of a particular domain name. Models may be created based on known typical domain names by extracting N-grams from the known typical domain names such that each N-gram size may be associated with a separate model. As will be understood by those of skill in the art, an N-gram may be a contiguous sequence of "N" characters from a character string. For example, an N-gram may be a sequence of "N" letters and/or numbers in a domain name.

In one embodiment, a name or textual data may be obtained and compared to known typical, e.g., safe or benign, names or textual data to determine whether the obtained name or obtained textual data is likely to be typical. An obtained name may be divided into N-grams, e.g., bi-grams and/or tri-grams, and compared to N-grams associated with known typical names. By dividing an obtained name into N-grams and performing an N-gram analysis on the obtained name, it may be ascertained how the N-grams of the obtained name compare to N-grams that have historically been part of typical names.

Figure 1:
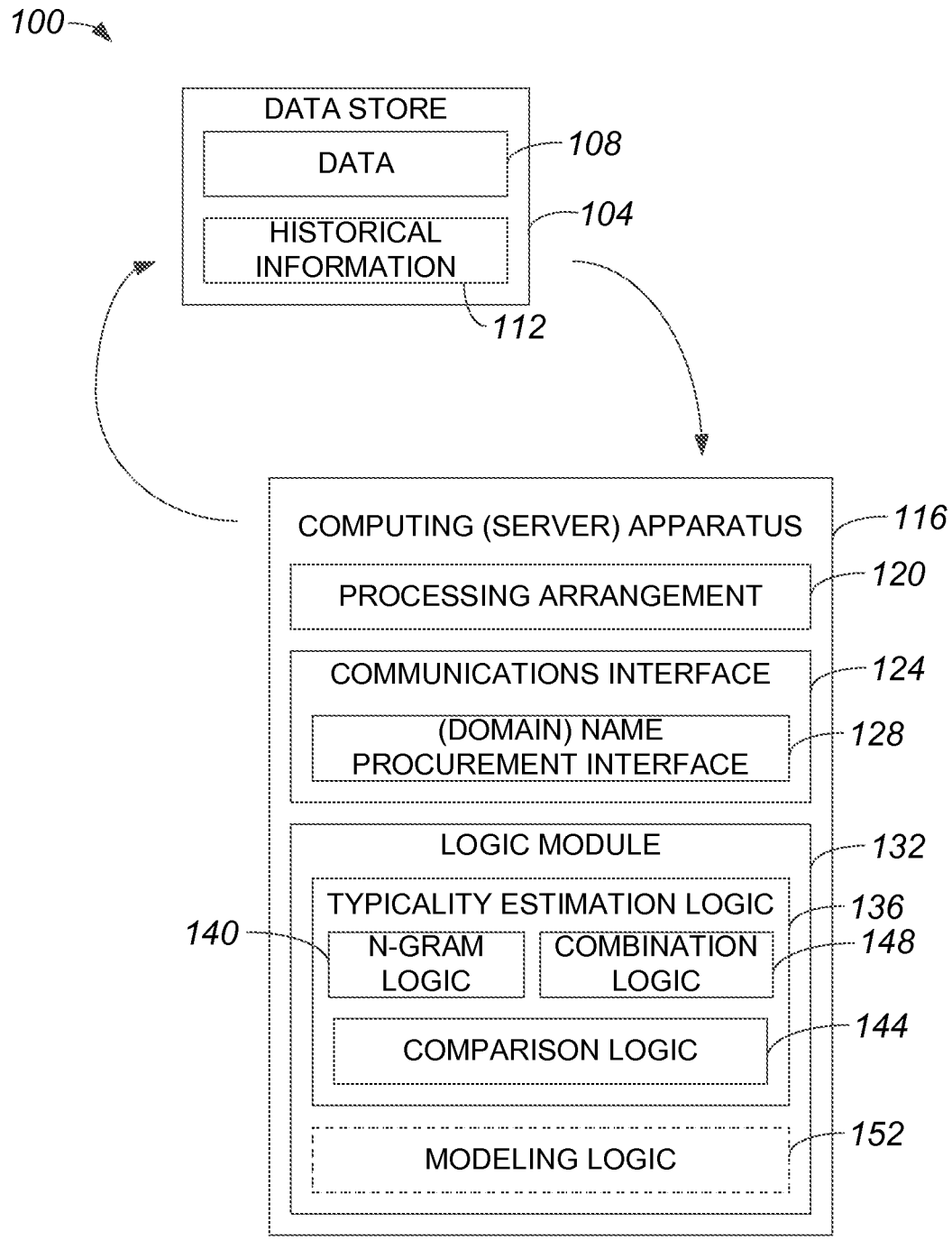
FIG. 1 is a block diagram representation of an overall system that is suitable for estimating the typicality of a name, e.g., an Internet domain name or a file name, in accordance with an embodiment.

Referring initially to FIG. 1, an overall system that is suitable for estimating the typicality of a name, e.g., an Internet domain name or a file name, or textual data will be described in accordance with an embodiment. An overall system 100 which may be part of a communications network includes a computing, e.g., server, apparatus 116 and a data store 104. Computing apparatus 116 is generally arranged to obtain a name, and to access data store 104 to obtain information that may be used to ascertain whether the name is likely to be typical. Herein and after, for purposes of discussion, a name will generally be described as a domain name, e.g., an Internet domain name. It should be appreciated, however, that a name is not limited to being a domain name, and may be any suitable name including, but not limited to including, a file name.

Computing apparatus 116 includes a processing arrangement 120, a communications interface 124, and a logic module 132. Processing arrangement 120 is generally arranged to execute logic, e.g., computer program code, associated with logic module 132 and/or to process signals obtained by computing apparatus 116. In one embodiment, processing arrangement 120 includes at least one central processing unit (CPU).

Communications interface 124 is configured to allow computing apparatus 116 to communicate within a network, as for example with data store 104. Communications interface 124 includes a name procurement interface 128 arranged to obtain a domain name, e.g., a domain name to be assessed. Name procurement interface 128 may be configured to substantially directly obtain a domain name. In other words, name procurement interface 128 may include an I/O interface that allows a user to interact with computing apparatus 116 to provide a domain name. Alternatively, name procurement interface 128 may be configured to obtain a domain name from an external device (not shown), as for example a device in the possession of a user, once a user attempts to access a domain associated with the domain name. In one embodiment, name procurement interface 128 may effectively intercept a domain name in a transmission sent by an external device (not shown).

Logic module 132 generally includes hardware and/or software logic that allows computing apparatus 116 to estimate the typicality of a domain name. Logic module 132 includes typicality estimation logic 136 and optional modeling logic 152. Typicality estimation logic 136 includes N-gram logic 140, comparison logic 144, and combination logic 148.

N-gram logic 140 is configured to extract N-grams of any number of different sizes from a domain name. For example, N-gram logic 140 may extract bi-grams, tri-grams, and/or four-grams. N-gram logic 140 is also configured to determine how many different N-grams sizes are to be extracted. That is, N-gram logic 130 determines whether N-grams of more than one size are to be extracted.

Comparison logic 144 is configured to compare N-grams extracted from a domain name to information associated with known typical domain names. For example, when bi-grams and tri-grams are extracted from a domain name, comparison logic 144 may compare the extracted bi-grams and tri-grams to information relating to bi-grams and tri-grams associated with known typical domain names. In general, comparison logic 144 determines whether each N-gram is likely indicative of a valid N-gram, or an N-gram that is likely associated with a typical domain name.

Combination logic 148 is configured to combine information relating to different N-grams, as generated by comparison logic 144, to ascertain whether a domain name is likely to be typical. Combination logic 148 may generate at least one "strangeness score" for a domain name using information relating to different N-grams, and may ascertain whether a strangeness score for a domain name indicates that the domain name is likely to be typical.

Optional modeling logic 152 is configured to generate at least one model that may be used to ascertain whether a domain name is typical. That is, modeling logic 152 may be included in logic module 132, and may be arranged to model typical domain names. In one embodiment, modeling logic 152 may mine benign domain names, e.g., from real-world Internet traffic, and/or obtain benign domain names stored in data store 104. Modeling logic 152 may use any number of benign domain names to create any number of models. The creation of a model may include, but is not limited to including, stripping primary segments from benign domain names, discarding top-level domain and subdomain characters from benign domain names, extracting N-grams of multiple sizes from benign domain names, and storing the extracted N-grams. In general, modeling logic 152 may create a substantially separate model for each N-gram size.

Data store 104, which may generally be a database, stores data 108 pertaining to typical domain names. Data 108 may include legitimate, e.g., safe or benign, domain names that were obtained as a result of mining Internet traffic. Data store 104 may also store historical information 112, or information obtained through processing data 108. Historical information 112 generally includes information relating to N-grams of multiple sizes which have been extracted from data 108. In one embodiment, N-grams may be stored in a hash table. Historical information 112 may also include models relating to N-grams, e.g., models created using modeling logic 152.

Figure 2:
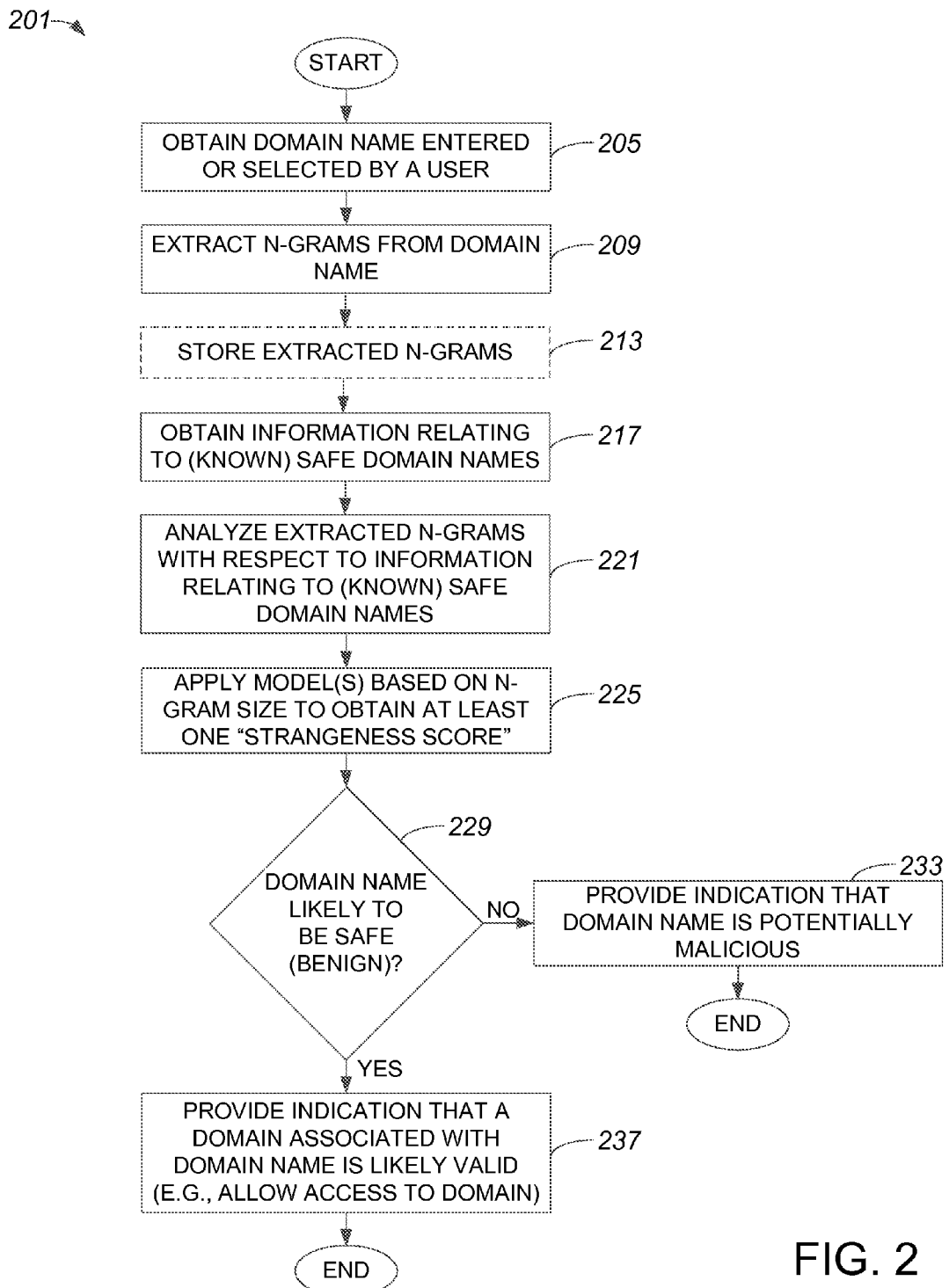
FIG. 2 is a process flow diagram which illustrates one method of estimating the typicality of a domain name using a typicality estimation logic module, e.g., typicality estimation logic module 136 of FIG. 1, in accordance with an embodiment.

With reference to FIG. 2, one method of estimating the typicality of a particular domain name using a typicality estimation logic module, e.g., typicality estimation logic module 136 of FIG. 1, will be described in accordance with an embodiment. A method 201 of estimating the typicality of a particular domain name from the point of view of a typicality estimation logic module begins at step 205 in which a domain name entered or selected by a user is obtained. A user may enter a domain name into a field of a web browser on a device such as a smartphone or a computer, or the user may select or otherwise attempt to activate a domain name in a browser window displayed on a device. The domain name entered or selected by the user may effectively be intercepted by the typicality estimation logic module.

In step 209, N-grams are extracted from the domain name obtained in step 205. It should be appreciated that any number of N-grams may be extracted. The number of N-grams that may be extracted may vary widely depending upon factors including, but not limited to including, the configuration of the typicality estimation logic module and the number of characters included in the obtained domain name. In some instances, N-grams for a single value of "N" may be extracted while, in other instances, N-grams for multiple values of "N" may be extracted. One method of extracting N-grams from a domain name will be discussed below with reference to FIG. 4.

Once N-grams are extracted from the domain name, the extracted N-grams may optionally be stored, e.g., in a data store, in step 213. In step 217, information relating to safe domain names is obtained. The information relating to safe domain names, e.g., N-grams associated with typical domain names, may be obtained from a data store. After information relating to safe domain names is obtained, the N-grams extracted from the domain name are analyzed with respect to the information relating to safe domain names in step 221. Analyzing N-grams extracted from a domain name may generally include comparing the N-grams extracted from the domain name to N-grams associated with safe domain names.

One or more models is applied in step 225 to the N-grams extracted from the domain name to obtain at least one strangeness score for the domain name. The model or models applied may be selected based on the sizes of the N-grams obtained from the domain name. The models applied may include a flat model in which N-grams are analyzed regardless of where the N-grams are located in the domain name, and a state model in which N-grams are analyzed by taking into account the location of the N-grams in the domain name. One embodiment of a flat model will be described below with respect to FIG. 6, while one embodiment of a state model will be described below with respect to FIG. 7.

From step 225, process flow moves to step 229 in which it is determined whether the domain name obtained in step 205 is likely to be safe. Such a determination may be made based on any strangeness scores obtained in step 225. For example, at least one strangeness score for the domain name may be compared to a threshold, e.g., a variable threshold, such that if the strangeness score is above the threshold, the strangeness score indicates that the domain name is likely malicious, atypical, or unsafe.

If it is determined in step 229 that the domain name is not likely to be safe, then process flow moves to step 233 in which an indication that the domain name is potentially malicious, or is likely not typical, is provided. The indication that the domain name is potentially malicious may be a notification which notifies a user to exercise caution with respect to the domain name. It should be appreciated that the indication is typically provided to the user on the device used by the user to enter or otherwise select the domain name. In one embodiment, the indication that the domain name is potentially malicious may involve substantially blocking access to content associated with the domain name by not allowing access to the domain identified by the domain name. Once an indication that the domain name is potentially malicious is provided, the method of estimating the typicality of a domain name is completed.

Alternatively, if the determination in step 229 is that the domain name is likely to be safe, an indication is provided in step 237 which indicates that the domain associated with the domain name is likely valid. Providing an indication that the domain name is likely valid may include allowing access to the domain identified by the domain name. After an indication that the domain name is likely valid is provided, the method of estimating the typicality of a domain name is completed.

In general, as described above, an N-gram analysis may be used substantially alone to determine whether a domain name is likely to be safe. It should be appreciated, however, that in some embodiments, an N-gram analysis may be one of any number of factors used to assess whether a domain name is likely to be safe or not to be safe. That is, a method of estimating the typicality of a domain name may include obtaining a strangeness score based on an N-gram analysis of the domain name, as well as other classification resources. Other factors or classification resources used in addition to an N-gram analysis may include, but are not limited to including, any suitable classification algorithm and human analysis.

Figure 3:
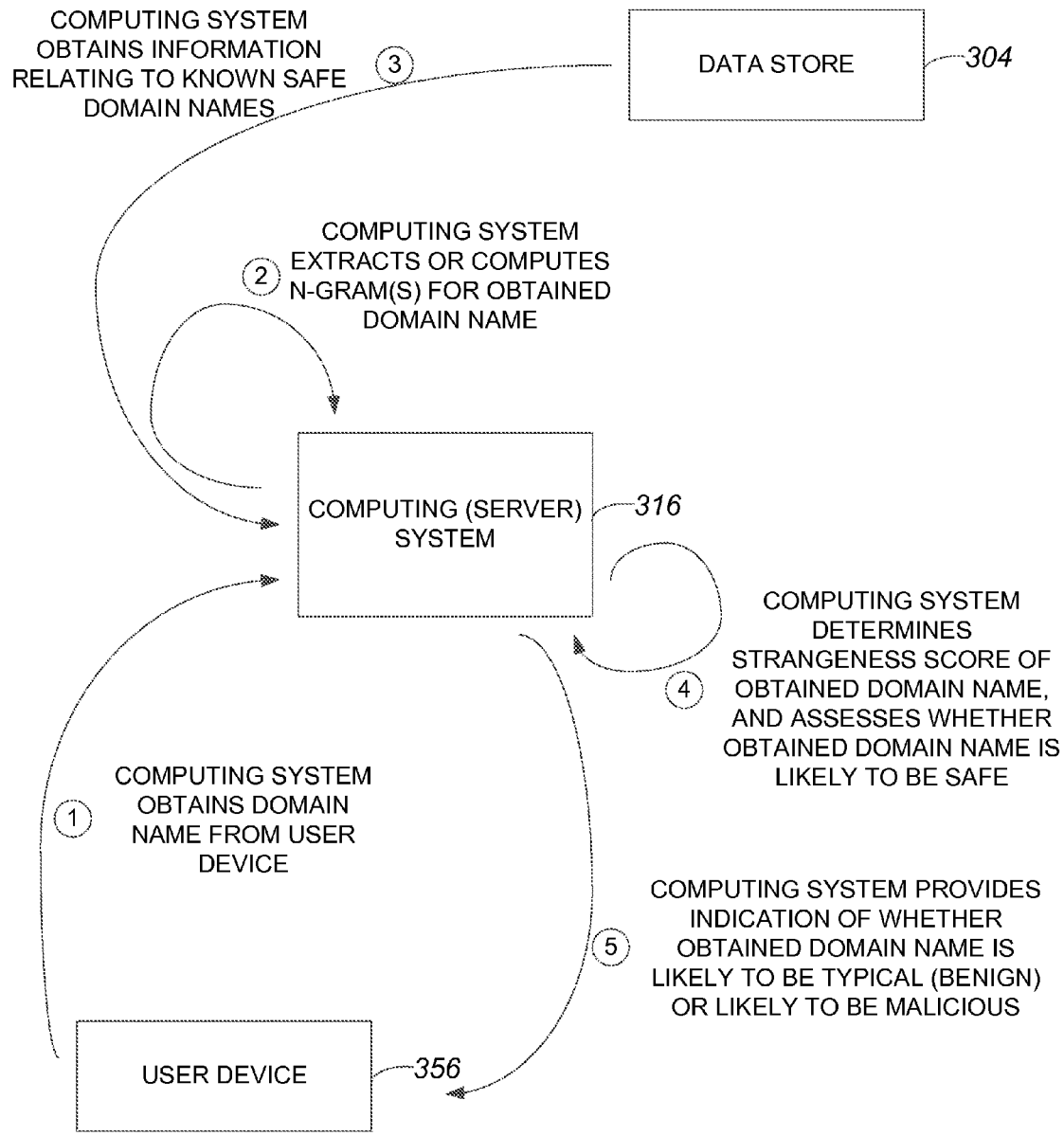
FIG. 3 is a diagrammatic representation of a process of providing a user device with an indication of whether a particular domain name is likely to be safe or likely to be malicious in accordance with an embodiment.

FIG. 3 is a diagrammatic representation of a process of providing a user device with an indication of whether a particular domain name is likely to be safe or likely to be malicious in accordance with an embodiment. When a user uses a user device 356, e.g., a smartphone or computer, to enter or select a domain name, a computing system 316 may obtain the domain name from the user device 356. Once computing system 316 obtains the domain name from user device 356, computing system 316 may extract N-grams from or otherwise compute N-grams for the obtained domain name.

In addition to extracting N-grams from the obtained domain name, computing system 316 obtains information relating to typical domain names, or domain names known to be safe. The information relating to typical domain names may be obtained from a data store 304. As previously mentioned, the information generally includes N-grams which are associated with typical domain names.

Computing system 316 uses the N-grams extracted from the obtained domain name and the information obtained from data store 304 to determine at least one strangeness score for the obtained domain name. Using a strangeness score, computing system 316 estimates or otherwise assesses whether the obtained domain name is typical. Once computing system 316 estimates whether the obtained domain name is typical, computing system 316 provides an indication to user device 356 of whether the obtained name is estimated to be typical or benign.

Figure 4:
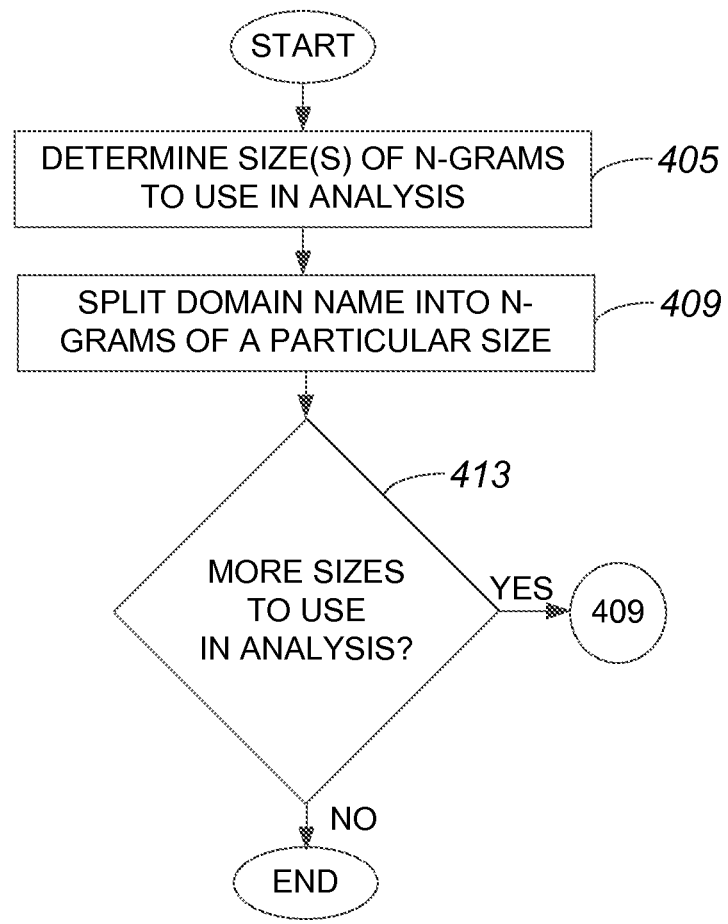
FIG. 4 is a process flow diagram which illustrates one method of extracting N-grams from a domain name, e.g., step 209 of FIG. 2, in accordance with an embodiment.

Referring next to FIG. 4, one process of extracting N-grams from a domain name, e.g., step 209 of FIG. 2, will be described in accordance with an embodiment. A process 209 of extracting N-grams from a domain name, i.e., a domain name to be assessed, begins at step 405 in which it is determined how many different sizes of N-grams are to be used in an analysis of whether a domain name is likely to be typical. In other words, it is determined how many values of "N" are to be used with respect to N-grams. It should be appreciated that any number of different sizes of N-grams may be used in an analysis.

Once the number of sizes of N-grams to use in analysis is determined, the domain name is split in step 409 into N-grams of a first particular size. By way of example, if a first particular size has a value of "N" equal to three, and a domain name is "abcde," the domain name may be split into an "abc" trigram, a "bcd" trigram, and "cde" trigram. Splitting a domain name into N-grams of a particular size will be discussed below with reference to FIG. 5.

A determination is made in step 413 as to whether there are more sizes of N-grams to use in analysis. If the determination is that there are more sizes of N-grams to use in analysis, process flow returns to step 409 in which the domain name is split into N-grams of another particular size. Alternatively, if the determination in step 413 is that there are no more sizes of N-grams to use in analysis, the process of extracting N-grams from a domain name is completed.

Figure 5:
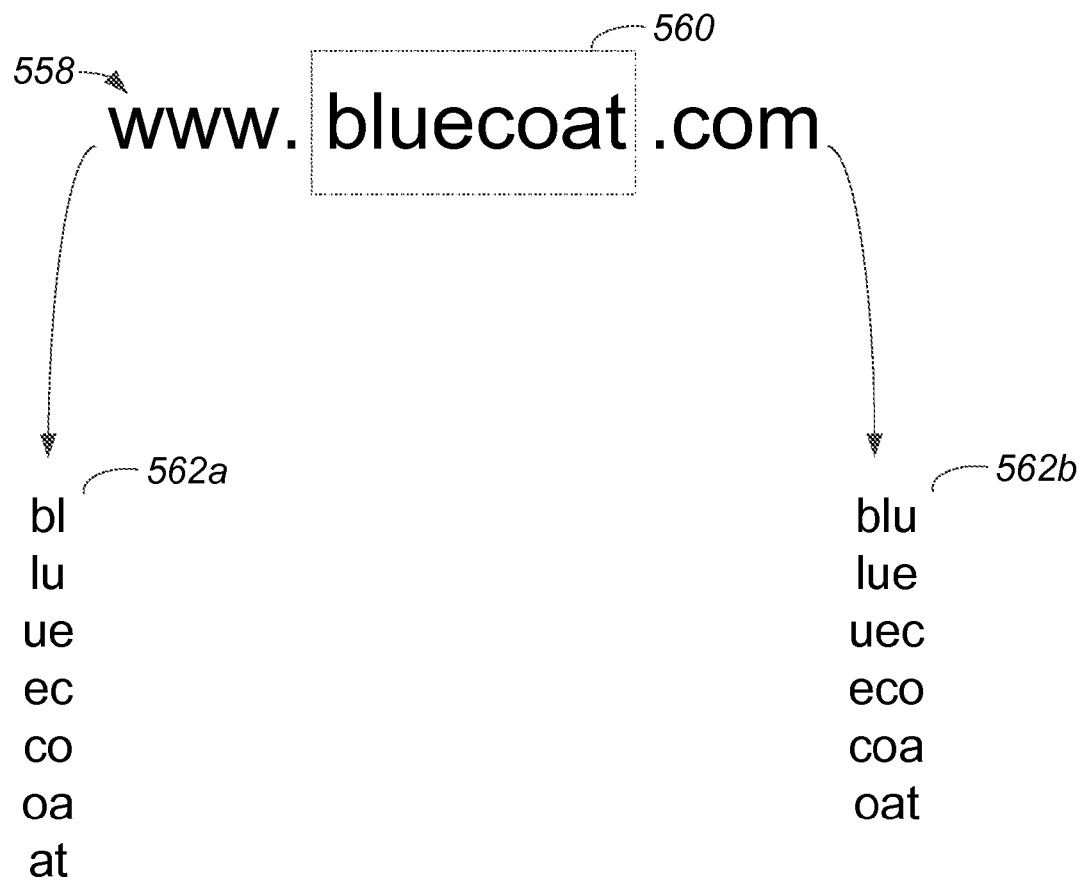
FIG. 5 is a diagrammatic representation of a domain name that is processed to extract N-grams in accordance with an embodiment.

When N-grams are extracted from a domain name, the domain name may be processed to effectively strip the domain name down to a core segment. With reference to FIG. 5, the processing of a domain name will be described in accordance with an embodiment. FIG. 5 is a diagrammatic representation of a domain name that is processed to extract N-grams. As shown, an overall domain name 558 that is to be divided into N-grams is "www.bluecoat.com." Overall domain name 558 includes a core 560 which, as shown, is "bluecoat." In general, prior to extracting N-grams, overall domain name 558 is stripped to its core segment. That is, the "www" prefix and the ".com" extension of overall domain name 558 are ignored and N-grams may be based substantially only on core 560. In general, any prefix and/or extension to core 560 may effectively be stripped out before N-grams are extracted.

When core 560 of overall domain name 558 is to be processed to extract bi-grams, or N-grams when "N" has a value of two, seven bigrams 562a may be extracted. As shown, bigrams 562a for "bluecoat" are "bl," "lu," "ue," "ec," "co," "oa," and "at." When core 560 of overall domain name 558 is to be processed to extract trigrams six trigrams may be extracted. Trigrams 562b for "bluecoat" are "blu," "lue," "uec," "eco," "coa," and "oat."

A model may be applied to N-grams, e.g., bi-grams or tri-grams, extracted from a domain name in order to ascertain the typicality of a domain name, as previously mentioned. Models that may be applied to N-grams extracted from a domain name include, but are not limited to including, a flat model and a state model. A method of applying a flat, or stateless, model will be discussed with respect to FIG. 6, while a method of applying a state model will be discussed with respect to FIG. 7.

In general, a flat model used to ascertain the typicality of a name does not take into account the position of different N-grams within the name. For instance, the appearance of a tri-gram "abc" is treated substantially the same regardless of where in a name the tri-gram "abc" appears. A state model, on the other hand, accounts for the particular location of an N-gram, e.g., position of a first character in the N-gram, in a name when determining whether the name is typical. For example, in a state model, the appearance of a tri-gram "abc" may be treated differently depending upon where in a name the tri-gram "abc" occurs. While more training data may be needed for a state model than for a flat model, a state model may be more discriminative than a flat model.

Figure 6:
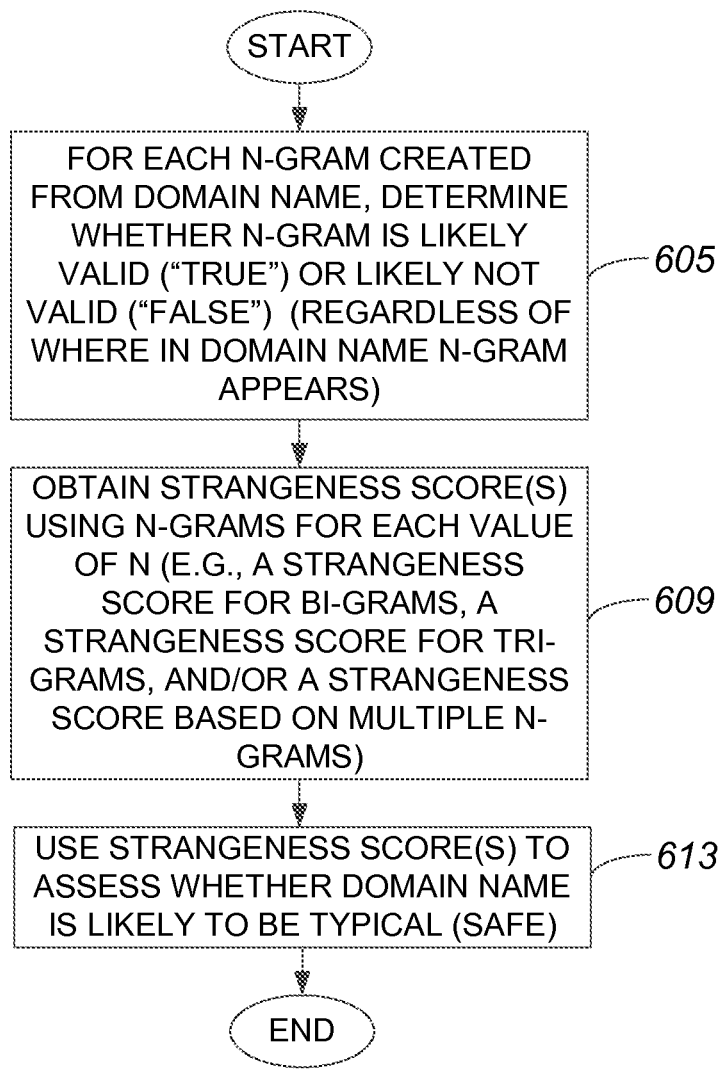
FIG. 6 is a process flow diagram which illustrates one method of applying a flat model to ascertain the typicality of a domain name, e.g., step 225 of FIG. 2, in accordance with an embodiment.

FIG. 6 is a process flow diagram which illustrates one method of applying a flat model to ascertain the typicality of a domain name, e.g., step 225 of FIG. 2, in accordance with an embodiment. A process 225' of applying a flat model to ascertain the typicality of a domain name begins at step 605 in which each N-gram created from a domain name is compared to historical N-gram data to determine whether each N-gram is likely valid, e.g., "true," or likely not valid, e.g., "false." The historical N-gram data provides an indication of whether a particular N-gram is characterized as likely valid or characterized as likely not valid. It should be appreciated that, as previously discussed, historical N-gram data may be obtained by extracting N-grams from domain names which are known to be typical.

For a flat model, the location of an N-gram within a domain name does not have an effect on the likelihood that the N-gram is valid. For example, whether a tri-gram of "uec" is located at the beginning, middle, or end of a domain name does not affect the likelihood that the trigram "uec" is valid.

In step 609, at least one strangeness score is obtained using N-grams. A strangeness score may be obtained by substantially amalgamating the characterizations of each N-gram. By way of example, if a core of a domain name is "bluecoat," a first tri-gram "blu" may be characterized as true, a second tri-gram "lue" may be characterized as true, a third tri-gram "uec" may be characterized as false, a fourth tri-gram "eco" may be characterized as true, a fifth tri-gram "coa" may be characterized as true, and a sixth tri-gram "oat" may be characterized as true. A strangeness score for "bluecoat" may indicate that five out of six tri-grams are true.

In one embodiment, the number of strangeness scores obtained may depend on the number of different sizes of N-grams that are created from the domain name. For example, if bi-grams and tri-grams are extracted from the domain name, one strangeness score may be determined for the bi-grams and another strangeness score may be determined for the tri-grams. Alternatively, in another embodiment, a single strangeness score may be determined using all sizes of N-grams that are created from the domain name. For example, if bi-grams and tri-grams are extracted from the domain name, a single strangeness score may be obtained using both the bi-grams and the tri-grams.

Once at least one strangeness score is obtained in step 609, process flow moves to step 613 in which the strangeness score is used to assess whether a domain name is likely to be typical, e.g., benign or safe. Using a strangeness score to assess whether a domain name is likely to be typical may involve, but is not limited to involving, comparing the strangeness score to a threshold value such that if the strangeness score is less than the threshold value, the indication is that the domain name is likely to be typical. After it is assessed whether a domain name is likely to be typical through the use of at least one strangeness score, the process of applying a flat model to ascertain the typicality of a domain name is completed.

Figure 7:
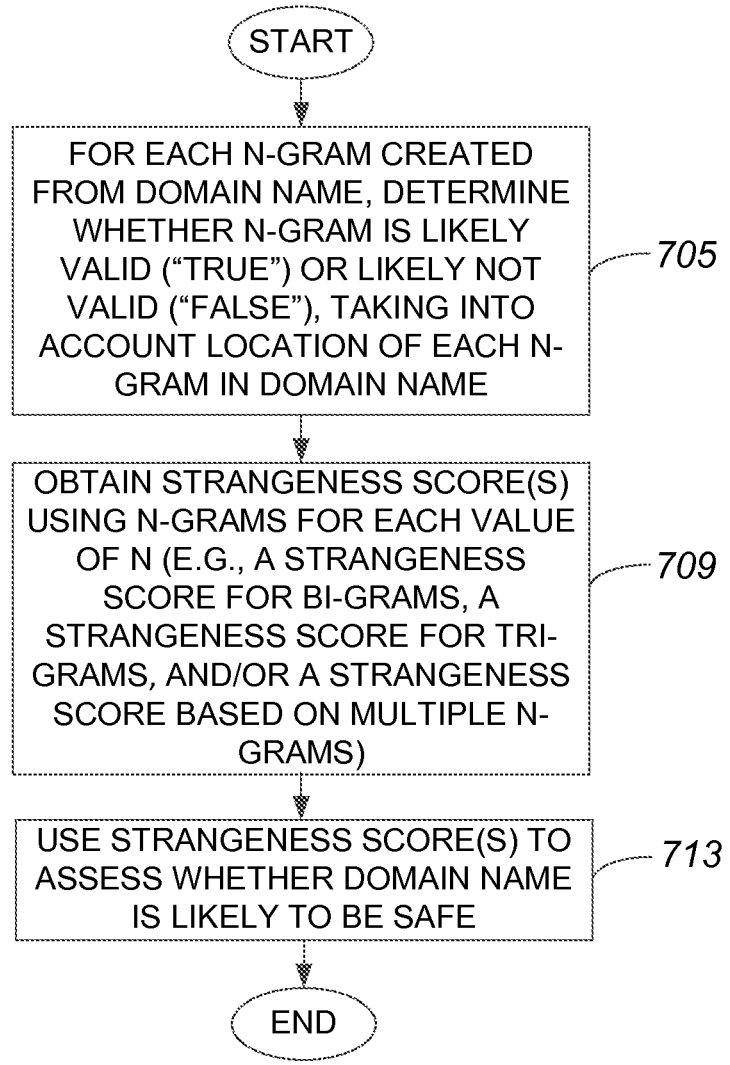
FIG. 7 is a process flow diagram which illustrates one method of applying a state model to ascertain the typicality of a domain name, e.g., step 225 of FIG. 2, in accordance with an embodiment.

FIG. 7 is a process flow diagram which illustrates one method of applying a state model to ascertain the typicality of a domain name, e.g., step 225 of FIG. 2, in accordance with an embodiment. A process 225″ of applying a state model to ascertain the typicality of a domain name begins at step 705 in which, taking into account the location of each N-gram created from a domain name within the domain name, each N-gram is compared to historical N-gram data to determine whether each N-gram is likely valid, e.g., "true," or likely not valid, e.g., "false." The historical N-gram data provides an indication of whether a particular N-gram is characterized as likely valid or characterized as likely not valid. It should be appreciated that, as previously discussed, historical N-gram data may be obtained by extracting N-grams from domain names which are known to be typical.

For a state model, the location of an N-gram within a domain name has an effect on the likelihood that the N-gram is valid. By way of example, when a bi-gram of "ft" is located at the beginning of a domain name, the likelihood that the bi-gram is valid is lower than the likelihood that the bi-gram is valid if located at the middle or the end of a domain name, as natural words generally do not begin with "ft," but some natural words that have "ft" in the middle or at the end.

At least one strangeness score is obtained using N-grams in step 709. After at least one strangeness score is obtained, process flow moves to step 713 in which the strangeness score is used to assess whether a domain name is likely to be typical, e.g., benign or safe. Once it is assessed whether a domain name is likely to be typical through the use of at least one strangeness score, the process of applying a state model to ascertain the typicality of a domain name is completed.

Figure 8:
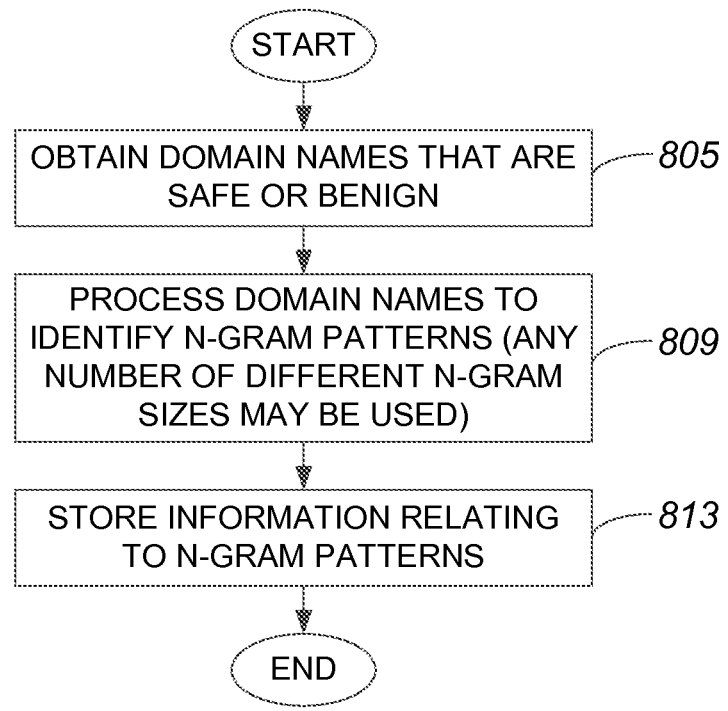
FIG. 8 is a process flow diagram which illustrates one method of creating a model based on domain names which are known to be safe in accordance with an embodiment.

In one embodiment, a model that is applied to N-grams of a particular size to obtain a strangeness score is initially created using a pool of typical domain names, and may be updated periodically, e.g., when a particular number of new typical domain names are identified. With reference to FIG. 8, one method of creating a model based on domain names that are known to be typical will be described in accordance with an embodiment. A method 801 of creating a model based on domain names begins at step 805 in which a number of domain names that are typical, or known to be safe or benign, are obtained. It should be appreciated that the number of domain names may vary widely. The domain names may be obtained from any suitable source, as for example a data store or a repository.

After the typical domain names are obtained, the domain names are processed in step 809 to identify N-gram patterns. Any number of different N-gram sizes may be used to process the domain names. For example, each domain name may be processed to identify bi-gram patterns and tri-gram patterns. Processing domain names generally also includes identifying how often particular N-gram patterns occur in the domain names and determining which N-gram patterns are generally indicative of typical domain names. For an embodiment in which a model is a state model, processing domain names includes identifying how often particular N-gram patterns occur in particular locations within the domain names.

Once the domain names are processed to identify N-gram patterns, information relating to the N-gram patterns is stored in step 813. The information may be stored in a data store or a repository, e.g., the same data store or repository from which the typical domain names were obtained in step 805. The method of creating a model is completed upon storing the information relating to N-gram patterns.

Although only a few embodiments of the present invention have been described, it should be understood that the present invention may be embodied in many other specific forms without departing from the spirit or the scope of the present invention. By way of example, while estimating the typicality of domain names and file names has generally been discussed, the techniques described above are not limited to being applied to estimating the typicality of domain names and file names for security purposes. The techniques discussed above may be applied to detecting substantially any atypical names or words for any suitable purpose. For instance, the systems and methods which are suitable for estimating the typicality of domain names and file names may be used to, but are not limited to being used to, estimate the popularity of Internet domains, estimate the lifespan of Internet domains, and detect atypical web content.

It should be appreciated that the typicality of an N-gram pattern may be estimated in a variety of different ways. When processing typical domain names to identify different N-gram patterns as discussed above with respect to step 809 of FIG. 8, any suitable classification method may generally be used. For example, any N-gram observed in a single valid domain name may be fully indicative of a typical N-gram. Alternatively, the typicality of an N-gram pattern may be estimated based on an occurrence frequency across an entire training set, e.g., set of known typical domain names processed to identify N-gram patterns indicative of typical domain names.

While a repository of typical names, e.g., domain names which have been identified as being safe or benign, has been described as being used as a basis of modeling typical names, it should be appreciated that a model which effectively identifies typical names may be generated using any suitable method. That is, a model which is used to ascertain whether a name in question is typical is not limited to being generated using multiple known typical names. For example, a model may be created based on knowledge of character patterns of known languages.

Any number of typical names may generally be used to create a model that is used to ascertain whether a given name is likely to be benign or likely to be malicious. In one embodiment, the use of one million or more typical names is preferred. It should be appreciated, however, that even a single typical name may be used to create a model in some situations. Additionally, while information relating to typical names has been described as being stored in a data store or a repository, such information is not limited to being stored in a data store or a repository.

A user device that is used to provide a domain name and a computing system that is used to estimate whether the domain name is typical have generally been described as being separate elements within a network. It should be understood that in some instances, a user device used to provide a domain name and a computer system used to estimate whether the domain name is typical may be a single device. That is, a domain name may be provided substantially directly to a system that is configured to estimate whether the domain name is typical. In one embodiment, one computer may be arranged to substantially directly obtain a domain name from a user and to estimate whether the domain name is typical.

The embodiments may generally be implemented as hardware and/or software logic embodied in a tangible, i.e., non-transitory, medium that, when executed, is operable to perform the various methods and processes described above. That is, logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals such as those embodied in carrier waves. That is, a computer-readable medium may be associated with non-transitory tangible media and transitory propagating signals.

The steps associated with the methods described above may vary widely. Steps may be added, removed, altered, combined, and reordered without departing from the spirit of the scope of the present invention. For example, a typicality estimation logic module has been described as extracting N-grams from a domain name obtained from a user. In one embodiment, a typicality estimation logic module may first determine whether a domain name obtained from a user is a substantially exact match to a domain name that is known to be safe. When the domain name obtained from a user is a substantially exact match to the domain name that is known to be safe, then the estimation logic module may decide not to extract N-grams. Alternatively, N-grams may be extracted from an obtained domain name if the obtained domain name is not a substantially exact match to the domain name that is known to be safe. Therefore, the present examples are to be considered as illustrative and not restrictive, and the examples are not to be limited to the details given herein, but may be modified within the scope of the appended claims.

The many features of the embodiments of the present invention are apparent from the written description. Further, since numerous modifications and changes will readily occur to those skilled in the art, the present invention should not be limited to the exact construction and operation as illustrated and described. Hence, all suitable modifications and equivalents may be resorted to as falling within the spirit or the scope of the present invention.

What is claimed is:

1. A method of protecting a computing apparatus by determining whether an Internet domain name is associated with a malicious Internet domain, the method comprising:
    obtaining, by a computing apparatus over a network, the Internet domain name from a user device, the Internet domain name including a plurality of characters;
    determining a first and second N-gram size;
    extracting a first plurality of N-grams of the first N-gram size from the Internet domain name and extracting a second plurality of N-grams of the second N-gram size from the Internet domain name;
    analyzing the first plurality of N-grams with respect to a first model, the first model being selected from a plurality of models based on the determined first N-gram size and associated with known typical Internet domain names, wherein analyzing the first plurality of N-grams with respect to the first model includes generating a first strangeness score that is dependent on respective locations of the first plurality of N-grams within the Internet domain name;
    analyzing the second plurality of N-grams with respect to a second model, the second model being selected from the plurality of models based on the determined second N-gram size and associated with known typical Internet domain names, wherein analyzing the second plurality of N-grams with respect to the second model includes generating a second strangeness score that is dependent on respective locations of the second plurality of N-grams within the Internet domain name;
    comparing the first strangeness score and the second strangeness score with a threshold;
    determining whether the Internet domain name is typical based on the comparing, wherein the Internet domain name is typical when the first strangeness score and the second strangeness score are below the threshold; and
    in response to determining that the Internet domain name is not typical, determining that the Internet domain name is not safe, and performing, by the computing apparatus, a security action to protect the computing apparatus with respect to the unsafe Internet domain name.

2. The method of claim 1,
    wherein the first score is generated by comparing the first plurality of N-grams to the set of N-grams.

3. The method of claim 2, further comprising:
    obtaining the known typical Internet domain names and extracting the set of N-grams from the known typical Internet domain names so as to generate the first model.

4. The method of claim 1, further comprising: based on the determination of whether the Internet domain name is typical, determining whether the Internet domain name is likely associated with a malicious Internet domain.

5. The method of claim 1, further comprising: identifying a core that is a part of the Internet domain name, wherein extracting the first plurality of N-grams of the first N-grams size from the Internet domain name includes extracting the first plurality of N-grams from the core of the Internet domain name.

6. The method of claim 1, further comprising: in response to determining that the Internet domain name is typical, providing an indication to a user that the Internet domain name is typical, wherein the Internet domain name is obtained from the user.

7. The method of claim 6, further comprising: in response to determining that the Internet domain name is not typical, providing an indication to the user that the Internet domain name is not typical.

8. The method of claim 1, wherein the Internet domain name is a name of a file.

9. A tangible, non-transitory computer-readable medium comprising computer program code that, when executed by a processor, causes the processor to:
    obtain over a network an Internet domain name from a user device, the Internet domain name including a plurality of characters;
    determine a first and second N-gram size;

extract a first plurality of N-grams of the first N-gram size from the Internet domain name and extract a second plurality of N-grams of the second N-gram size from the Internet domain name;

analyze the first plurality of N-grams with respect to a first model, the first model being selected from a plurality of models based on the determined first N-gram size and associated with known typical Internet domain names, wherein analyzing the first plurality of N-grams with respect to the first model includes generating a first strangeness score that is dependent on respective locations of the first plurality of N-grams within the Internet domain name;

analyze the second plurality of N-grams with respect to a second model, the second model being selected from the plurality of models based on the determined second N-gram size and associated with known typical Internet domain names, wherein analyzing the second plurality of N-grams with respect to the second module includes generating a second strangeness score that is dependent on respective locations of the second plurality of N-grams within the Internet domain name;

compare the first strangeness score and the second strangeness score with a threshold;

determine whether the Internet domain name is typical based on the comparing, wherein the Internet domain name is typical when the first strangeness score and the second strangeness score are below the threshold; and in response to determining that the Internet domain name is not typical, determine that the Internet domain name is not safe, and perform, by the processor, a security action to protect the processor with respect to the unsafe Internet domain name.

10. The tangible, non-transitory computer-readable medium of claim 9, wherein the first score is generated by comparing the first plurality of N-grams to the set of N-grams.

11. The tangible, non-transitory computer-readable medium of claim 10, further comprising computer program code that, when executed by the processor, further causes the processor to obtain the known typical Internet domain names and to extract the set of N-grams from the known typical Internet domain names so as to generate the first model.

12. The tangible, non-transitory computer-readable medium of claim 9, further comprising computer program code that, when executed by the processor, causes the processor to, based on the determination of whether the Internet domain name is typical, determine whether the Internet domain name is likely associated with a malicious Internet domain.

13. The tangible, non-transitory computer-readable medium of claim 9, further comprising computer readable program code that, when executed by the processor, causes the processor to identify a core that is a part of the Internet domain name, wherein extracting the first plurality of N-grams of the first N-gram size from the Internet domain name comprises extracting the first plurality of N-grams from the core of the Internet domain name.

14. The tangible, non-transitory computer-readable medium of claim 9, further comprising computer program code that, when executed by the processor, causes the processor to, in response to determining that the Internet domain name is typical, provide an indication to a user that the Internet domain name is typical, wherein the Internet domain name is obtained from the user.

15. The tangible, non-transitory computer-readable medium of claim 14, further comprising computer program code that, when executed by the processor, causes the processor to, in response to determining that the Internet domain name is not typical provide an indication to the user that the Internet domain name is not typical.

16. The tangible, non-transitory computer-readable medium of claim 9, wherein the Internet domain name is a name of a file.

17. An apparatus configured to protect a computing apparatus by determining whether an Internet domain name is associated with a malicious Internet domain, the apparatus comprising:

a communications interface configured to obtain over a network the Internet domain name from a user device;

a module including computer program code, the module configured to:

extract a first plurality of N-grams of a first N-gram size from the Internet domain name, and extract a second plurality of N-grams of the second N-gram size from the Internet domain name, analyze the first plurality of N-grams with respect to a first model, the first model being selected from a plurality of models based on the first N-gram size and associated with known typical Internet domain names, wherein analyzing the first plurality of N-grams with respect to the first model includes generating a first strangeness score that is dependent on respective locations of the first plurality of N-grams within the Internet domain name, and wherein the first model includes a set of N-grams being associated with a plurality of known typical Internet domain names, analyze the second plurality of N-grams with respect to a second model, the second model being selected from the plurality of models based on the determined second N-gram size and associated with known typical Internet domain names, wherein analyzing the second plurality of N-grams with respect to the second model includes generating a second strangeness score that is dependent on respective locations of the second plurality of N-grams within the Internet domain name, compare the first strangeness score and the second strangeness score with a threshold;

determine whether the Internet domain name is typical based on the comparing, wherein the Internet domain name is typical when the first strangeness score and the second strangeness score are below the threshold, and in response to determining that the Internet domain name is not typical, determine that the Internet domain name is not safe, and perform, by the apparatus, a security action to protect the apparatus with respect to the unsafe Internet domain name; and a processing arrangement configured to execute the computer program code.

18. The apparatus of claim 17, wherein the communications interface is further configured to obtain the Internet domain name from a device and to notify the device when the Internet domain name is determined to be typical.

19. The apparatus of claim 17, wherein the communications interface is further configured to obtain the set of N-grams from a data store.

20. The apparatus of claim 17, further comprising a modeling arrangement configured to extract the set of N-grams from the plurality of known typical Internet domain names.

* * * * *